(12) United States Patent
Guetter et al.

(10) Patent No.: US 8,577,177 B2
(45) Date of Patent: Nov. 5, 2013

(54) SYMMETRIC AND INVERSE-CONSISTENT DEFORMABLE REGISTRATION

(75) Inventors: Christoph Guetter, Lawrenceville, NJ (US); Christophe Chefd'hotel, Jersey City, NJ (US); Hui Xue, Franklin Park, NJ (US); Jens Guehring, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 162 days.

(21) Appl. No.: 13/291,370

(22) Filed: Nov. 8, 2011

(65) Prior Publication Data

US 2012/0121200 A1    May 17, 2012

Related U.S. Application Data

(63) Continuation-in-part of application No. 12/894,255, filed on Nov. 30, 2010.

(60) Provisional application No. 61/412,455, filed on Nov. 11, 2010.

(51) Int. Cl.
*G06K 9/32*    (2006.01)

(52) U.S. Cl.
USPC .......................................... 382/294; 382/131

(58) Field of Classification Search
USPC .......................................... 382/294, 128, 131
See application file for complete search history.

(56) References Cited

U.S. PATENT DOCUMENTS

| 6,611,615 | B1* | 8/2003 | Christensen | 382/130 |
| 2008/0095422 | A1* | 4/2008 | Suri et al. | 382/131 |
| 2009/0231335 | A1* | 9/2009 | Von Berg et al. | 345/420 |

OTHER PUBLICATIONS

Beg et al. "Symmetric Data Attachment Terms for Large Deformation Image Registration." IEEE Transactions on Medical Imaging, vol. 26, No. 9, Sep. 2007, pp. 1179-1189.*
Mohagheghian et al. "Symmetric Multi-scale Image Registration." 2010 Annual International Conference of the IEEE Engineering in Medicine and Biology Society, Aug. 31, 2010, pp. 5931-5934.*
Tao et al. "Mutual Information Driven Inverse Consistent Nonlinear Registration." 30th Annual International Conference of the IEEE Engineering in Medicine and Biology Society, Aug. 20, 2008, pp. 3957-3960.*

* cited by examiner

*Primary Examiner* — Jon Chang

(57) ABSTRACT

A method for symmetric and inverse-consistent registration of a pair of digital images includes calculating a first update of a forward transformation of a first digital image to a second digital image from a previous update of the forward transformation and a gradient of a cost function of the first and second digital images, calculating a first update of a backward transformation of the second digital image to the first digital image from an inverse of the first update of the forward transformation, calculating a second update of the backward transformation from first update of the backward transformation and the gradient of a cost function of the second and first digital images, and calculating a second update of the forward transformation from an inverse of the second update of the backward transformation.

21 Claims, 3 Drawing Sheets

US 8,577,177 B2

SYMMETRIC AND INVERSE-CONSISTENT DEFORMABLE REGISTRATION

CROSS REFERENCE TO RELATED UNITED STATES APPLICATIONS

This application claims priority from "Efficient Symmetric and Inverse-Consistent Deformable Registration through Interleaved Optimization", U.S. Provisional Application No. 61/412,455 of Guetter, et al., filed Nov. 11, 2010, the contents of which is herein incorporated by reference in its entirety.

This application is a continuation-in-part of "System and Method for Cardiac Segmentation in MR-Cine Data using Inverse Consistent Deformable Registration", U.S. patent application Ser. No. 12/894,255 of Jolly, et al., filed Nov. 30, 2010, the contents of which is herein incorporated by reference in its entirety.

TECHNICAL FIELD

This disclosure is directed to methods for deformable registration in digital imaging.

DISCUSSION OF THE RELATED ART

Deformable registration is a crucial building block in a number of challenging medical image analysis tasks such as motion estimation and analysis, template matching, segmentation, image reconstruction, and so on. In current systems, it has become increasingly important to have symmetric deformable registration methods that also provide an inverse solution because they deliver higher accuracy on challenging image data through consistent treatment of image gradients and a symmetric evaluation of the cost function. Moreover, the inverse transformation can connect time series data or follow-up studies for flexible transformation of image objects among these data and for data visualization. Therefore, symmetric deformable registration is currently an active area of research with many academic solutions that are, unfortunately, rather costly to realize.

In general, a deformable registration transformation may be solved by computing a deformation field $\hat{\Phi}$ as follows:

$$\hat{\Phi}_{12} = \underset{\Phi_{12}}{\operatorname{argmin}} J(I_1, I_2, \Phi_{12}) \quad (1)$$

where J is a cost functional that depends on the two images $I_1$, $I_2$, and transformation field $\Phi_{12}$ that describes the transformation from $I_1$ to $I_2$. The deformation field $\Phi_{12}$ can be determined by descending the gradient of J using an iterative scheme of small updates:

$$\Phi_{12,k+1} = \Phi_{12,k} \cdot (id + \sigma \cdot \nabla J * G_\sigma) \quad (2)$$

where id represents the identity transformation, $\tau$ controls the step size along the gradient, and $G_\sigma$ represents a Gaussian filter of width $\sigma$. A registration is symmetric in case $$J(I_1, I_2, \Phi_{12}) = J(I_2, I_1, \Phi_{21}) \quad (3)$$

and the inverse transformation $\Phi_{21} = \Phi_{12}^{-1}$ fulfills $$\Phi_{12} \cdot \Phi_{12}^{-1} = id \quad (4)$$

the identity transformation.

SUMMARY

Exemplary embodiments of the invention as described herein generally include methods and systems for a deformable registration algorithm that implements a symmetric cost function resulting in a symmetric registration at little performance loss as compared to non-symmetric registration. Besides increasing registration accuracy, an algorithm according to an embodiment of the invention delivers a highly accurate inverse transformation.

According to an aspect of the invention, there is provided a method for symmetric and inverse-consistent registration of a pair of digital images, including calculating a first update of a forward transformation of a first digital image to a second digital image from a previous update of the forward transformation and a gradient of a cost function of the first and second digital images, calculating a first update of a backward transformation of the second digital image to the first digital image from an inverse of the first update of the forward transformation, calculating a second update of the backward transformation from first update of the backward transformation and the gradient of a cost function of the second and first digital images, and calculating a second update of the forward transformation from an inverse of the second update of the backward transformation.

According to a further aspect of the invention, the method includes repeating the steps of calculating a first update of the forward transformation, calculating a first update of the backward transformation, calculating a second update of the backward transformation, and calculating a second update of the forward transformation until the gradient of the cost function has converged to a minimum.

According to a further aspect of the invention, the method includes, after the cost function gradient has converged, calculating an average of the forward transformation and the backward transformation.

According to a further aspect of the invention, the method includes initializing at least one of the forward transformation and the backward transformation.

According to a further aspect of the invention, the forward transformation and the inverse of the forward transformation are initialized to an identity transformation.

According to a further aspect of the invention, the forward transformation and the inverse of the forward transformation are initialized to a registration transformation of a previous pair of digital images in a time series of digital images.

According to a further aspect of the invention, the method includes adapting a step size associated with the gradient of the cost function to increase for later updates of the forward and backward transformations, subject to a predetermined maximum step size.

According to a further aspect of the invention, the method includes initializing an error correction to one of the forward and backward transformations after updating one of the forward and backward transformations, and calculating the error correction according to $\phi_{j+1}^{-1} = v(-\phi_j(id \cdot \phi_j^{-1}(x))) + (1-v)\phi_j^{-1}(x)$, $j=1,\ldots,K$, $v \in [0,1]$, where $\phi_j$, $\phi_j^{-1}$ are the to-be-corrected forward and backward transformations, K is the number of iterations for which the error correction is calculated, id is an identity transformation, x is an image point, and v is a weighting factor that trades off convergence speed and robustness.

According to a further aspect of the invention, the first and second digital images are successive images in a time series of images, and further comprising selecting the second image to as a key frame, where each successive image in the time series is registered to the key frame.

According to another aspect of the invention, there is provided a non-transitory program storage device readable by a computer, tangibly embodying a program of instructions executed by the computer to perform the method steps for symmetric and inverse-consistent registration of a pair of digital images.

DETAILED DESCRIPTION OF EXEMPLARY EMBODIMENTS

Figure 1:
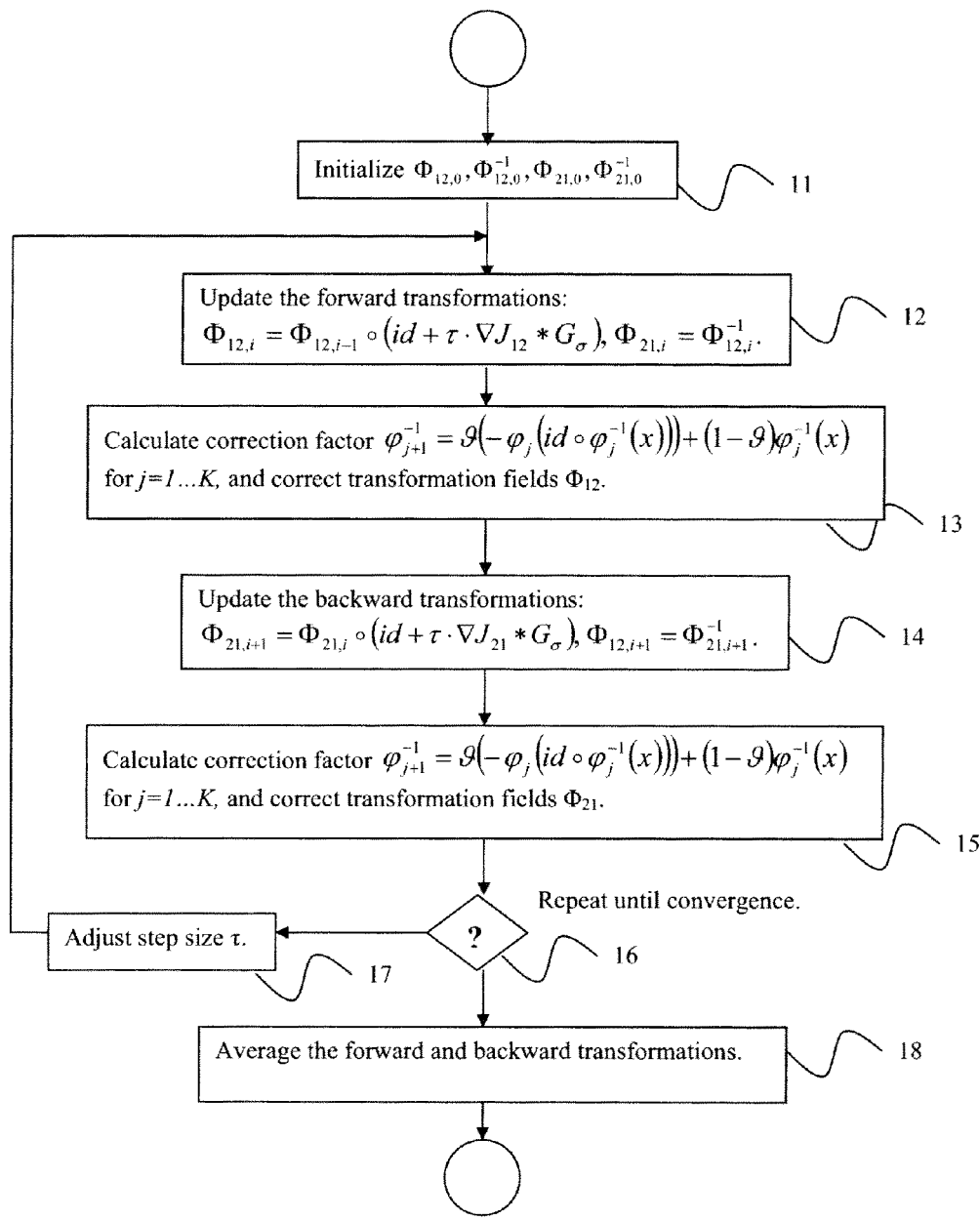
FIG. 1 is a flow chart of a symmetric and inverse-consistent deformable registration algorithm, according to an embodiment of the invention.

Exemplary embodiments of the invention as described herein generally include systems and methods for algorithm for symmetric and inverse-consistent deformable registration. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-dimensional images and voxels for 3-dimensional images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-dimensional picture or a 3-dimensional volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

A registration method according to an embodiment of the invention embodies a new philosophy of how to efficiently compute inverse consistent image registration using an iterative gradient-decent optimization scheme. An algorithm according to an embodiment of the invention can swap the registration direction after each iteration step until convergence is reached. At every change of direction, an inverse transformation will be estimated and used as the input forward deformation field for the next iteration. A formulation according to an embodiment of the invention also includes an inverse consistency error energy that is enforced after convergence is reached by eliminating any residual error between forward and estimated inverse transformation.

The efficient swapping of registration direction plus additional inverse transformation estimation during each iteration step does not add significant computational cost compared to non-symmetric registration.

An iterative registration scheme according to an embodiment of the invention can alternate the registration direction at each iteration step as follows:

$$\Phi_{12,0} = \Phi_{12,0}^{-1} = \Phi_{21,0} = \Phi_{21,0}^{-1} = I, \quad (5)$$

$$\Phi_{12,1} = \Phi_{12,0} \circ (id + \tau \cdot \nabla J_{12} * G_\sigma),$$

$$\Phi_{21,1} = \Phi_{12,1}^{-1},$$

$$\Phi_{21,2} = \Phi_{21,1} \circ (id + \tau \cdot \nabla J_{21} * G_\sigma),$$

$$\Phi_{12,2} = \Phi_{21,2}^{-1},$$

$$\Phi_{12,3} = \Phi_{12,2} \circ (id + \tau \cdot \nabla J_{12} * G_\sigma),$$

$$\vdots$$

where $\tau$ determines the step size along the gradients $\nabla J_{12}$, $\nabla J_{21}$, and $G_\sigma$ represents a Gaussian filter of width $\sigma$.

According to an embodiment of the invention, the following iterative inverse transformation correction step may be used at each registration iteration:

$$\phi_{j+1}^{-1} = v(-\phi_j(id \cdot \phi_j^{-1}(x))) + (1-v)\phi_j^{-1}(x),$$

$$j=0, \ldots, N,$$

$$v \in [0,1], \quad (6)$$

where N describes how many correction steps should be taken and $v$ is a constant that determines how aggressive the solution should be approached. The correction step can be repeated after registration convergence. An iterative registration scheme according to an embodiment of the invention can combine previous and current iteration step during the displacement field update.

This results in (1) a highly accurate inverse transformation, in which $\Phi_{12,1} \cdot \Phi_{12,1}^{-1} \approx id$; and (2) a symmetric cost function, $J \approx J_{12} \approx J_{21}$.

The step size parameter $\tau$ describes a trade-off between successful registration and achieving symmetry. An approximation according to an embodiment of the invention may be to applied to different cost functions J where the gradient $\nabla J$ exists and can be computed.

A deformable registration algorithm according to an embodiment of the invention may also include an inverse consistency error cost that may be enforced (i) at each iteration, (ii) at post-iteration, or (iii) both, to eliminate residual error in inverse calculation:

$$\phi_{i+1}^{-1} = v(-\phi_i(-\phi_i(id \cdot \phi_i^{-1}(x)))) + (1-v)\phi_i^{-1}(x),$$

$$i=0, \ldots N,$$

$$v \in [0,1] \quad (7)$$

A deformable registration of time series data according to an embodiment of the invention may involve determining a single key frame to which all images of a series are registered. For consistent use of image gradients that drive the first iteration, the key frame may be selected as an initial driving force in time series registration:

$$I_2 \equiv \text{keyframe, if} \quad (8)$$

$$\Phi_{12,1} = \Phi_{12,0} \circ (id + \tau \cdot \nabla J_{12} * G_\sigma),$$

$$\vdots$$

and every subsequent image is registered to $I_2$.

According to an embodiment of the invention, the initial iteration steps may determine the overall performance of the algorithm as there is a trade-off between achieving symmetric registration and registration accuracy. Therefore, according to an embodiment of the invention, the step size may be adaptive and can be chosen to be small for the first iterations and to be increased in later iterations, i.e. $\tau_0 \leq \tau_K$, where K=maximum number of iterations.

According to an embodiment of the invention, a true symmetric and inverse consistent solution can be achieved by combining the two deformation fields after convergence, as follows:

$$\hat{\Phi} = 0.5 \times (\hat{\Phi}_{12} + \hat{\Phi}_{21}) \qquad (9)$$

Alternatively, a true symmetric and inverse consistent solution can be calculating using the weighted averaging scheme of EQS. (7).

An algorithm according to an embodiment of the invention can be initialized with a provided deformation field. In time series data, it is useful to utilize a neighbor transformation as an initialization.

$$\Phi_{12,0} = \Phi_{12\_init}$$

$$\Phi_{12,0}^{-1} = \Phi_{12\_init}^{-1} \qquad (10)$$

A flowchart of an exemplary, non-limiting symmetric and inverse consistent registration algorithm according to an embodiment of the invention is presented in FIG. 1. Referring now to the figure, a registration algorithm according to an embodiment of the invention begins by initializing $\Phi_{12,0}$, $\Phi_{12,0}^{-1}$, $\Phi_{21,0}$, $\Phi_{21,0}^{-1}$ at step 11. A first update of the forward transformation from $I_1$ to $I_2$ is performed at step 12, in which $\Phi_{12,i} = \Phi_{12,i-1} \cdot (id + \tau \cdot \nabla J_{12,i-1} * G_\sigma)$, $\Phi_{21,i} = \Phi_{12,i}^{-1}$, where i is an iteration counter. A correction algorithm may be performed at step 13 using $\phi_{j+1}^{-1} v(-\phi_j (id \cdot \phi_j^{-1}(x))) + (1-v)\phi_j^{-1}(x)$, where $v \in [0,1]$. Here, the $\phi_1, \phi_1^{-1}$ may be initialized to $\Phi_{12,i}, \Phi_{12,i}^{-1}$, respectively, and the correction update may be performed for N iterations. The results $\phi_N, \phi_N^{-1}$ are respective corrections to $\Phi_{12,i}, \Phi_{12,i}^{-1}$, which may then be used to initialize the next iteration update of the registration transformations. A second update of the backward transformation from $I_2$ to $I_1$ is performed at step 14, in which $\Phi_{21,i+1} = \Phi_{21,i} \cdot (id + \tau \cdot \nabla J_{21,i} * G_\sigma)$, $\Phi_{21,i+1} = \Phi_{21,i+1}^{-1}$. Another correction algorithm for the backward transformation may be performed at step 15 similar to that performed at step 13 for the forward transformation, in which a correction factor is initialized to the current backward and inverse backward transformation and iterated for N steps. At step 16 it is checked whether the registration transformations have converged, i.e., whether the gradient descent of the cost functions $J_{12}, J_{21}$ in EQ. (1) have reached a minimum. If the minimum has been reached, a registration algorithm according to an embodiment of the invention may terminate, in which case the forward and backward transformations are, respectively $\hat{\Phi}_{12} = \hat{\Phi}_{12,k}$, $\hat{\Phi}_{21} = \hat{\Phi}_{21,k}$, where k is the total number of updates that have been performed. Otherwise, the step size r may be adjusted at step 17, subject to a predetermined maximum, and a registration algorithm according to an embodiment of the invention returns to step 12. Note that in some embodiments, the step of adjusting the step size may be omitted.

In addition, there is an additional optional correction at step 18, in which an average of the forward and backward transformations is calculated. This can either be done by using either the correction formula $\hat{\Phi}_{21,j+1} = v(-\hat{\Phi}_{12,j}(id \cdot \hat{\Phi}_{21,j}(id \cdot \hat{\Phi}_{21,j}(x)))) + (1-v)\hat{\Phi}_{21,j}(x)$, where de $v \in [0,1]$, or by calculating the following average $\hat{\Phi}_{12}^{corr} = 0.5 \times (\hat{\Phi}_{12} + \hat{\Phi}_{21}^{-1})$, and $\hat{\Phi}_{21}^{corr} = 0.5 \times (\hat{\Phi}_{21} + \hat{\Phi}_{12}^{-1})$ as defined above in EQ. (9).

In some embodiments, there may be a step of checking for convergence after the forward transformation is updated, in addition to the check after the backward transformation is updated. In other embodiments convergence is checked after every k updates, where k>1.

In other embodiments, one or both of the steps 13 and 15 of calculating a corrections factor may be omitted. In some other embodiments, the correction factors may be calculated after every k updates of one or both of the forward and backward transformations, where k>1, and in still other embodiments the correction factors are calculated after convergence has been determined at step 16.

In still other embodiments of the invention, an optional step may performed between steps 11 and 12 of selecting a keyframe, for example $I_2$. In this case, all subsequent images $I_n$, n>2, are registered to $I_2$.

Experimental Results

A symmetric deformable registration according to an embodiment of the invention may be applied to cardiac time series data where it contributes to the analysis of ventricular function. These data usually comprise short-axis MR slices that image the entire heart cycle at a certain time resolution.

Two distinctive time points in the cardiac cycle are the end-systolic (ES) and end-diastolic (ED) phases that delineate the full cardiac contraction. If accurate contours exist on either the ED or ES, a symmetric registration algorithm according to an embodiment of the invention can be used to propagate these contours to the other phase. Registration accuracy can then be judged by how good the propagated contours match the image contents.

Figure 2:
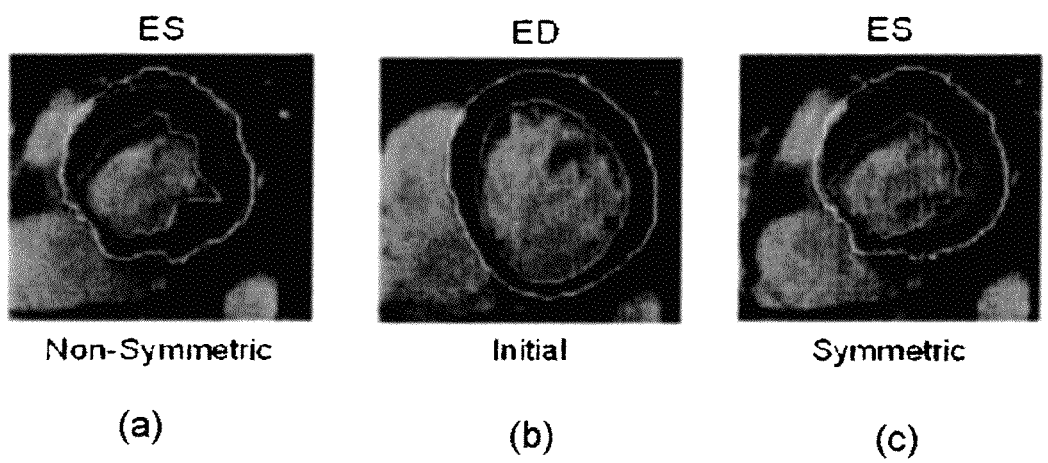
FIGS. 2(a)-(c) illustrate deformable registration results of ED when the ES phase is used to propagate contours between the phases, according to an embodiment of the invention.

FIGS. 2(a)-(c) illustrate comparisons of such propagation results between symmetric and non-symmetric registration. The symmetric registration result at the ES, depicted in FIG. 2(c), is more accurate and consistent than the non-symmetric registration result, depicted in FIG. 2(a).

Preliminary timings on cardiac cine data resulted in 15% higher computational times for a symmetric registration algorithm according to an embodiment of the invention when compared to a conventional non-symmetric computation.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 3:
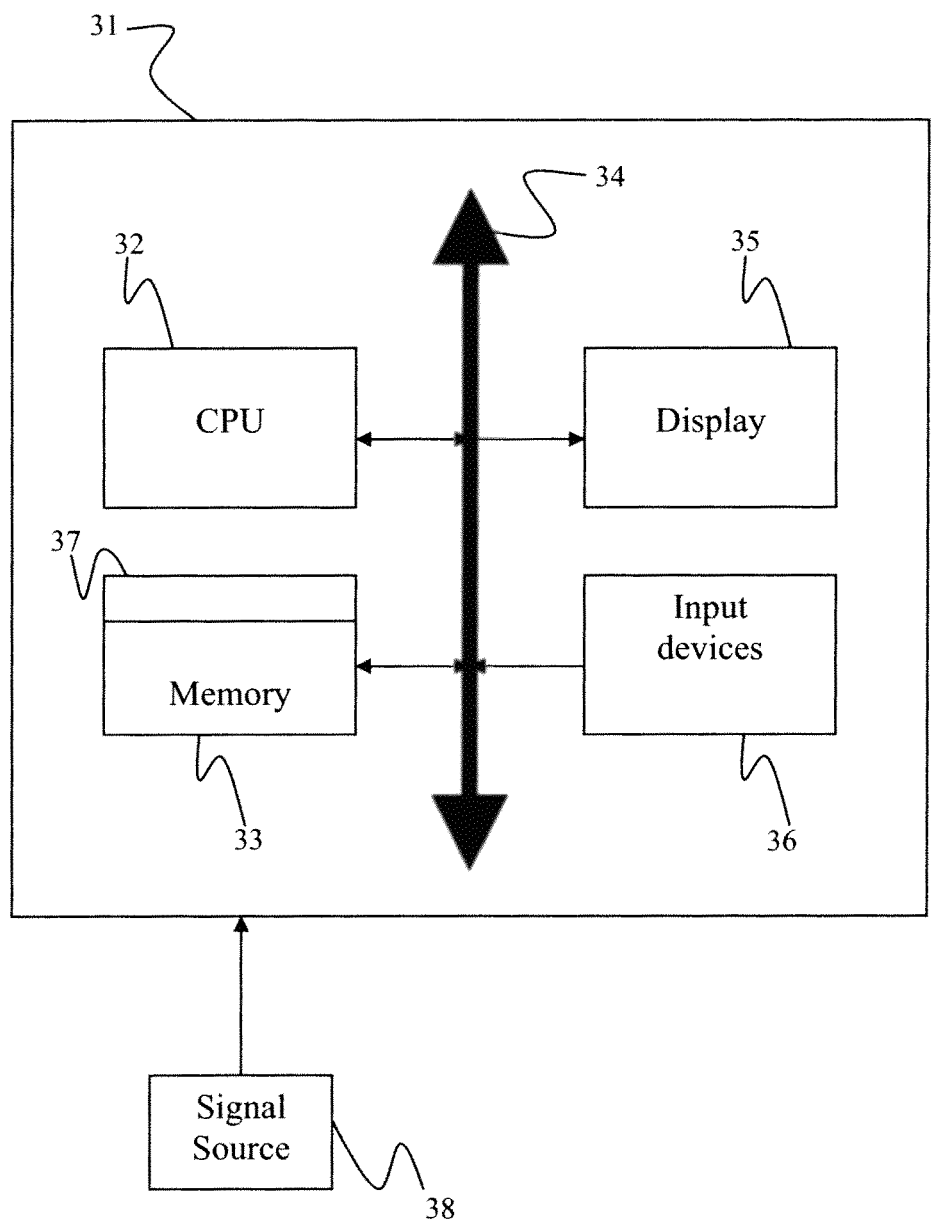
FIG. 3 is a block diagram of an exemplary computer system for implementing an algorithm for symmetric and inverse-consistent deformable registration, according to an embodiment of the invention.

FIG. 3 is a block diagram of an exemplary computer system for implementing an algorithm for symmetric and inverse-consistent deformable registration, an according to an embodiment of the invention. Referring now to FIG. 3, a computer system 31 for implementing the present invention can comprise, inter alia, a central processing unit (CPU) 32, a memory 33 and an input/output (I/O) interface 34. The computer system 31 is generally coupled through the I/O interface 34 to a display 35 and various input devices 36 such as a mouse and a keyboard. The support circuits can include circuits such as cache, power supplies, clock circuits, and a communication bus. The memory 33 can include random access memory (RAM), read only memory (ROM), disk drive, tape drive, etc., or a combinations thereof. The present invention can be implemented as a routine 37 that is stored in memory 33 and executed by the CPU 32 to process the signal from the signal source 38. As such, the computer system 31 is a general purpose computer system that becomes a specific purpose computer system when executing the routine 37 of the present invention.

The computer system 31 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method for symmetric and inverse-consistent registration of a pair of digital images, comprising the steps of:
   calculating a first update of a forward transformation of a first digital image to a second digital image from a previous update of the forward transformation and a gradient of a cost function of the first and second digital images;
   calculating a first update of a backward transformation of the second digital image to the first digital image from an inverse of the first update of the forward transformation;
   calculating a second update of the backward transformation from first update of the backward transformation and the gradient of a cost function of the second and first digital images; and
   calculating a second update of the forward transformation from an inverse of the second update of the backward transformation.

2. The method of claim 1, further comprising repeating said steps of calculating a first update of the forward transformation, calculating a first update of the backward transformation, calculating a second update of the backward transformation, and calculating a second update of the forward transformation until the gradient of said cost function has converged to a minimum.

3. The method of claim 2, further comprising, after said cost function gradient has converged, calculating an average of the forward transformation and the backward transformation.

4. The method of claim 1, further comprising initializing at least one of the forward transformation and the backward transformation.

5. The method of claim 4, wherein said forward transformation and the inverse of the forward transformation are initialized to an identity transformation.

6. The method of claim 4, wherein said forward transformation and the inverse of the forward transformation are initialized to a registration transformation of a previous pair of digital images in a time series of digital images.

7. The method of claim 1, further comprising adapting a step size associated with the gradient of the cost function to increase for later updates of the forward and backward transformations, subject to a predetermined maximum step size.

8. The method of claim 1, further comprising:
   initializing an error correction to one of the forward and backward transformations after updating one of said forward and backward transformations, and
   calculating the error correction according to $$\phi_{j+1}^{-1} = v(-\phi_j(id \cdot \phi_j^{-1}(x))) + (1-v)\phi_j^{-1}(x)$$

$$j=1,\ldots,K,$$

$$v \in [0,1],$$

wherein $\phi_j, \phi_j^{-1}$ are the to-be-corrected forward and backward transformations, K is the number of iterations for which the error correction is calculated, id is an identity transformation, x is an image point, and v is a weighting factor that trades off convergence speed and robustness.

9. The method of claim 1, wherein said first and second digital images are successive images in a time series of images, and further comprising selecting said second image as a key frame, wherein each successive image in the time series is registered to the key frame.

10. A method for symmetric and inverse-consistent registration of a pair of digital images, comprising the steps of:
    calculating a first update of a forward transformation of a first digital image to a second digital image from a previous update of the forward transformation and a gradient of a cost function of the first and second digital images;
    calculating a first update of a backward transformation of the second digital image to the first digital image from an inverse of the first update of the forward transformation;
    initializing an error correction to the forward transformation, and
    calculating the error correction for the forward transformation according to $$\phi_{j+1}^{-1} = v(-\phi_j(id \cdot \phi_j^{-1}(x))) + (1-v)\phi_j^{-1}(x)$$

$$j=1,\ldots,K,$$

$$v \in [0,1],$$

wherein $\phi_j, \phi_j^{-1}$ are the to-be-corrected forward and backward transformations, K is the number of iterations for which the error correction is calculated, id is an identity transformation, x is an image point, and v is a weighting factor that trades off convergence speed and robustness.

11. The method of claim 10, further comprising:
    calculating a second update of the backward transformation from first update of the backward transformation and the gradient of the cost function of the first and second digital images;
    calculating a second update of the forward transformation from an inverse of the second update of the backward transformation;
    initializing an error correction to the backward transformation, and
    calculating the error correction for the backward transformation the according to $$\phi_{j+1}^{-1} = v(-\phi_j(id \cdot \phi_j^{-1}(x))) + (1-v)\phi_j^{-1}(x)$$

$$j=1,\ldots,K,$$

$$v \in [0,1],$$

wherein $\phi_j, \phi_j^{-1}$ are the to-be-corrected forward and backward transformations, K is the number of iterations for which the error correction is calculated, id is an identity transformation, x is an image point, and v is a weighting factor that trades off convergence speed and robustness.

12. The method of claim 11, repeating said steps of calculating a first update of the forward transformation, calculating a first update of the backward transformation, correcting said forward transformation, calculating a second update of the backward transformation, and calculating a second update of the forward transformation, and correcting said backward transformation, until the gradient of said cost function has converged to a minimum.

13. A non-transitory program storage device readable by a computer, tangibly embodying a program of instructions executed by the computer to perform the method steps for symmetric and inverse-consistent registration of a pair of digital images, the method comprising the steps of:
calculating a first update of a forward transformation of a first digital image to a second digital image from a previous update of the forward transformation and a gradient of a cost function of the first and second digital images;
calculating a first update of a backward transformation of the second digital image to the first digital image from an inverse of the first update of the forward transformation;
calculating a second update of the backward transformation from first update of the backward transformation and the gradient of a cost function of the second and first digital images; and
calculating a second update of the forward transformation from an inverse of the second update of the backward transformation.

14. The computer readable program storage device of claim 13, the method further comprising repeating said steps of calculating a first update of the forward transformation, calculating a first update of the backward transformation, calculating a second update of the backward transformation, and calculating a second update of the forward transformation until the gradient of said cost function has converged to a minimum.

15. The computer readable program storage device of claim 14, the method further comprising, after said cost function gradient has converged, calculating an average of the forward transformation and the backward transformation.

16. The computer readable program storage device of claim 13, the method further comprising initializing at least one of the forward transformation and the backward transformation.

17. The computer readable program storage device of claim 16, wherein said forward transformation and the inverse of the forward transformation are initialized to an identity transformation.

18. The computer readable program storage device of claim 16, wherein said forward transformation and the inverse of the forward transformation are initialized to a registration transformation of a previous pair of digital images in a time series of digital images.

19. The computer readable program storage device of claim 13, the method further comprising adapting a step size associated with the gradient of the cost function to increase for later updates of the forward and backward transformations, subject to a predetermined maximum step size.

20. The computer readable program storage device of claim 13, the method further comprising:
initializing an error correction to one of the forward and backward transformations after updating one of said forward and backward transformations, and
calculating the error correction according to $$\phi_{j+1}^{-1} = v(-\phi_j(id \cdot \phi_j^{-1}(x))) + (1-v)\phi_j^{-1}(x)$$

$$j=1,\ldots,K,$$

$$v \in [0,1],$$

wherein $\phi_j, \phi_j^{-1}$ are the to-be-corrected forward and backward transformations, K is the number of iterations for which the error correction is calculated, id is an identity transformation, x is an image point, and v is a weighting factor that trades off convergence speed and robustness.

21. The computer readable program storage device of claim 13, wherein said first and second digital images are successive images in a time series of images, and further comprising selecting said second image as a key frame, wherein each successive image in the time series is registered to the key frame.

* * * * *